(No Model.)
J. MILLS, W. H. RATCLIFF & F. L. BARR.
PNEUMATIC TIRE FOR WHEELS.
No. 564,210. Patented July 21, 1896.
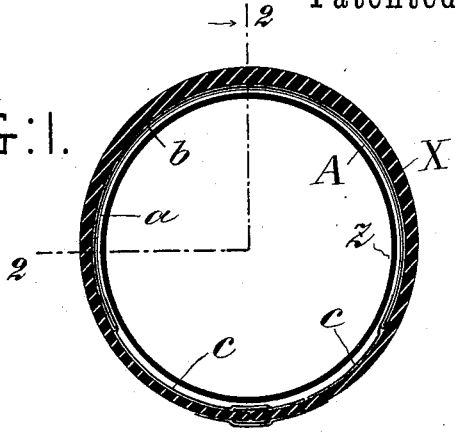
FIG: 1.
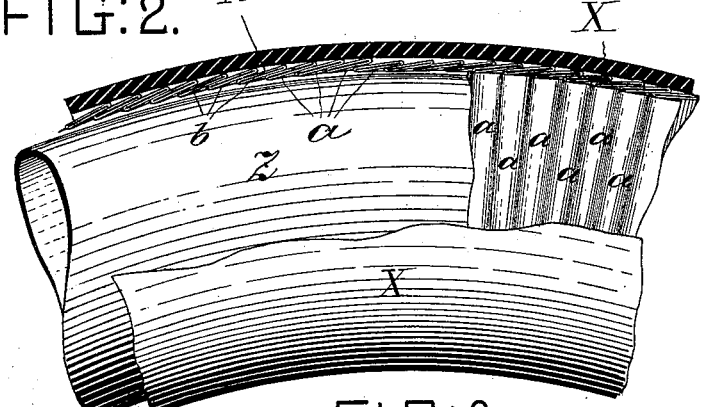
FIG: 2.
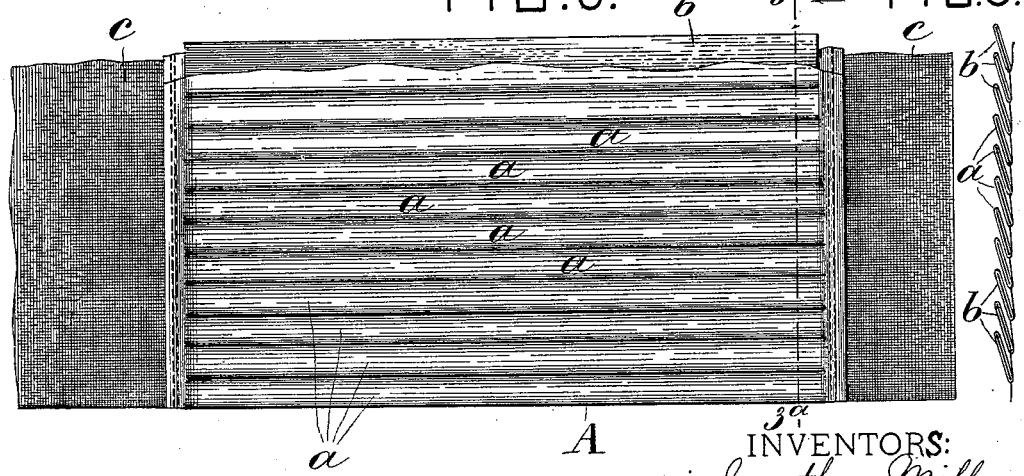
FIG: 3.     FIG: 3ª
WITNESSES:
INVENTORS:
Jonathan Mills
William H. Ratcliff
Fletcher L. Barr
By Henry Connett
Attorney.
THE NORRIS PETERS CO., PHOTO-LITHO., WASHINGTON, D. C.

UNITED STATES PATENT OFFICE.

JONATHAN MILLS, OF NEW YORK, N. Y., AND WILLIAM H. RATCLIFF AND FLETCHER L. BARR, OF NEWARK, NEW JERSEY, ASSIGNORS TO THE PUNCTURELESS TIRE COMPANY, OF WEST VIRGINIA.

PNEUMATIC TIRE FOR WHEELS.

SPECIFICATION forming part of Letters Patent No. 564,210, dated July 21, 1896.

Application filed December 4, 1895. Serial No. 571,041. (No model.)

*To all whom it may concern:*

Be it known that we, JONATHAN MILLS, a resident of the city, county, and State of New York, and WILLIAM H. RATCLIFF and FLETCHER L. BARR, residents of Newark, Essex county, New Jersey, citizens of the United States, have invented certain new and useful Improvements in Pneumatic Tires for Wheels, of which the following is a specification.

This invention relates to means for preventing the puncturing of the tire, and the object is to provide a simple and inexpensive armor for the tire which shall not detract from but rather add to its resiliency.

The accompanying drawings illustrate an embodiment of our invention.

In the drawings, Figure 1 is a transverse section of the tire provided with the armor. Fig. 2 is a section of a part of the tire, taken in the plane indicated by the line 2 2 in Fig. 1. Fig. 3 is a plan view of a fragment of the armor detached, and Fig. 3ª is a section of the same on the line 3ª 3ª in Fig. 3.

X represents a rubber tire of any kind, and Z the usual inflatable tube inside of the same.

A represents, as a whole, our armor, with which the tire X is lined to protect the tube Z against punctures.

Our armor A consists, preferably, of a strip of thin flexible material, as muslin, silk, or the like, plaited in such a manner as to form a laterally-overlapping series of pockets $a$, which extend transversely of the strip, and thin slips of steel or other hard metal $b$ in said overlapping pockets, whereby said slips also overlap each other. When this strip of armor is applied to the inner face of the hollow tire X, the slips of metal will be bent into a hoop-like form, as seen in Fig. 1. We prefer as a pocket fabric thin silesia, and we prefer to make the metal slips of spring-tempered steel, four to six one-thousandths of an inch thick and about three-eighths of an inch wide. We prefer to have these metal slips overlap each other about one-third of their widths at the crown of the wheel, and to have them extend around about two-thirds of the inner lateral diameter of the hollow of the tire X, as seen in Fig. 1. These materials, dimensions, and proportions need not be rigidly adhered to, of course. The strip of armor will be of the proper length to extend throughout the whole length of the tire or circumference of the wheel, and in order that it may be conveniently secured in place we prefer to provide it with lateral attaching-flaps $c\ c$, which may be cemented to the inner face of the tire when the armor is in place therein.

In making the pocket-strip of the armor, the fabric may be folded properly and the pockets be formed therein by rows of stitching.

We prefer to form the pockets $a$ so that they will extend across the strip at right angles to its margins, but they might be placed somewhat oblique to the margins without detriment. This arrangement will be readily understood without the necessity of illustration.

Our invention may be conveniently applied to any of the several kinds of pneumatic tires commonly used on bicycles and other vehicles, but it is best adapted to those having an inner inflatable tube. Where applied to a "hose" tire, it will have to be carefully cemented to the inner surface thereof, and the fabric should be of impermeable material.

It will be seen that our armor presents two distinct advantages, namely, protection against puncture and increase of resiliency of the tire. We find by experience that in order to attain these advantages the curved spring-slips $b$ should be relatively narrow and of such length as to extend a little more than half-way about the transverse circumference of the tubular tire, and that each slip must be free or independent throughout its length, while kept in place by being loosely inclosed in its pocket. This construction protects the tire at the sides as well as the crown, and enables the slips to conform freely to any distortion of the tire under the weight of the rider and thus permits the tire itself to retain its flexibility and full resilience. This is essential to the preservation of the resiliency of the tire. Where the armor consists merely of a centrally-arranged row of narrow overlapping scales, there is a distinct loss of resiliency and an entire lack of protection against puncture at the sides of the tire, and where the slips extend transversely in a curved shape conforming to the inner surface of the tire and are secured in such a manner as to connect their extremities together with more or less rigidity, the series of slips form an arch and destroy that flexibility and resiliency so necessary in these tires. Our construction avoids these objections by leaving each slip $b$ free to adjust itself to the curve of the tire and the distortions due to pressure thereon.

In making our armor we give to the thin metal slips a set curved form, substantially the same as that which it will have when in the tire, as seen in Fig. 1. This may be done by rolling or otherwise.

Having thus described our invention, we claim—

The combination with a pneumatic tire for a wheel, of an armor therefor comprising a strip of thin, flexible material, as muslin, having narrow, overlapping pockets formed in it and extending transversely thereof, and slips of thin spring metal inclosed loosely in said pockets so that each slip may have independent freedom of movement, said slips having their longitudinal axes arranged transversely of the tubular tire and being bent to a form corresponding to the circular form of the tire, substantially as and for the purposes set forth.

In witness whereof we have hereunto signed our names in the presence of two subscribing witnesses.

JONATHAN MILLS.
WILLIAM H. RATCLIFF.
FLETCHER L. BARR.

Witnesses:
HENRY CONNETT,
JAS. KING DUFFY.